June 10, 1941.  A. E. KARLBERG  2,245,106

SHAFT SEAL

Filed Nov. 24, 1939

INVENTOR.
Arnold Karlberg

Patented June 10, 1941

2,245,106

UNITED STATES PATENT OFFICE 2,245,106

SHAFT SEAL

Arvid E. Karlberg, Chicago, Ill., assignor to Chicago Seal Company, Chicago, Ill., a corporation of Illinois Application November 24, 1939, Serial No. 305,930

2 Claims. (Cl. 286—11)

This invention relates to an improvement in a shaft seal for compressors to prevent the leaking of oil and gas therefrom, and is in part a continuation of my co-pending application Ser. No. 91,466 filed July 20, 1936.

An object of my invention is to provide a seal that can replace a worn or injured one and can also be used as new equipment.

Some of the troubles I propose to overcome are the expertness required of service men in replacing a worn or damaged seal, the misalignment of the seal when replaced due to a worn or damaged shaft, the unevenness of the end plate due to the bolts being pulled down unevenly or the unevenness in the tension of the spring that is used to exert a pressure against the sealing face.

A seal is usually made up of several different parts that are assembled progressively. Different types of compressors use different types of seals. In one type of compressor there is a shoulder on the shaft outside the bearing portion. This will be designated as the inner end of the rotating seal. Against this shoulder is placed a washer made of an elastic material that is backed up by a metal washer and forms a fluid-tight joint and also acts as a driving means for the rotating portion of the seal assembly. At the other or outer end of the rotating assembly, a seal face is provided to mate with a seal face that is also set in an elastic material. This performs the duty of a fluid-tight seal for the stationary seal face.

In another type of seal, the outer end of the stationary part has a large disc fastened thereto and is clamped fluid-tight against the compressor by a heavy plate. This type does not rotate, and should the seal face become defective on the shaft shoulder or the assembly, the complete seal must be removed for inspection or repair.

In either of these types, should the force of the thrust against the elastic seal be unbalanced, a tilting condition will be set up between the elastic material and the metal washer. When this condition prevails, the result will be that a tendency for fluid to work its way between the shoulder and the elastic material or the metal washer and the elastic material, with damaging results to the compressor and the system.

In order to overcome this hazard, I propose to place against the shoulder of the shaft, an elastic material that is molded with a flat surface and a spherical convex surface, to mate with a spherical concave surface, for the inner end of the seal, and a spherical concave surface in an elastic material to mate with a spherical convex surface of a seal face member at the outer end. The latter mentioned elastic material being provided with flat end and side walls.

These flat walls as well as the universal joint effect of the concave and convex surfaces, provide exceptional resistance to fluid leaks as will be seen by the unique design which affords a radial thrust that acts, both against the end and the sides of the elastic material.

This invention will be best understood by reference to the drawing, in which.

Figure 1:
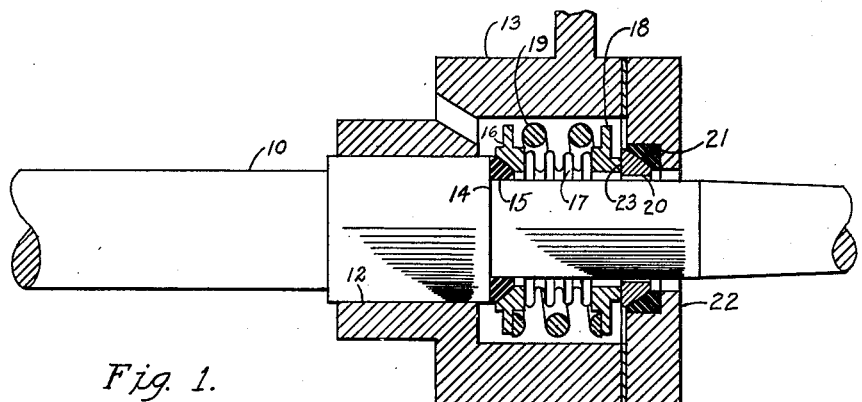
Figure 1 shows one form of my invention wherein a flexible bellows is used between the driving member and the seal face member.

Referring to the drawing, in Figure 1, member 10 represents the shaft of an ordinary compressor having a bearing portion 12 located in a compressor housing 13, and provided with a shoulder 14. Against the shoulder is an elastic member 15 having a convex surface nesting into a concave surface of a member 16 that provides the driving and fluid-tight contact for the rotating portion of the seal sub-assembly. This sub-assembly consists of a flexible member 17, a seal face member 18, and a resilient means 19 acting to force the members 16 and 18 apart.

The stationary seal face member 20 having a convex surface, and nested into an elastic member 21 having a concave surface, serves as a fluid-tight sub-assembly for the outer end of the seal. This outer elastic material is nested snugly into a counter-bore of an end plate 22. As the shaft 10 revolves, the elastic material 15, being pressed against the shoulder and fitting snugly around the shaft, provides a fluid-tight joint as well as the driving means to cause the seal assembly to rotate with the shaft. At the outer end of the rotating assembly, a seal face makes contact at 23 to make a movable fluid-tight joint.

Figure 3:
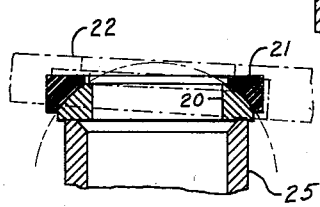
Figure 3 shows the spirit of my invention wherein the spherical concave and convex surfaces between an elastic material and the member used as a seal face can establish an absolute full fluid-tight contact should the face plate be slightly out of line.

If for any reason the seal face member should become worn or injured it is only necessary to remove the plate 22, to make the member 20 accessible for replacement. In replacing, it is simply necessary to lift out the damaged part and replace it with a new one, and replace the plate 22. The unit is then ready for operation. The member 20 seeks its own alignment due to its universal joint action provided for by a spherical concave and convex mating surface. Should the end plate 22 be tilted somewhat as shown in Figure 3, the elastic material 21 will follow along the contour of the spherical surfaces and maintain the fluid-tight joint.

In the case where the shoulder of the shaft is used as a seal face in conjunction with a stationary seal and it is necessary to replace or repair it, the damaged seal may be removed and the member 15 placed against the shaft, the balance of the rotating assembly placed against the member 15. This procedure follows by placing and fastening the end plate 22, provided with the stationary part of the seal mechanism. The compressor is then ready for operation. However, the stationary type of seal may be replaced completely by my novel seal as shown in the drawing.

Figure 2:
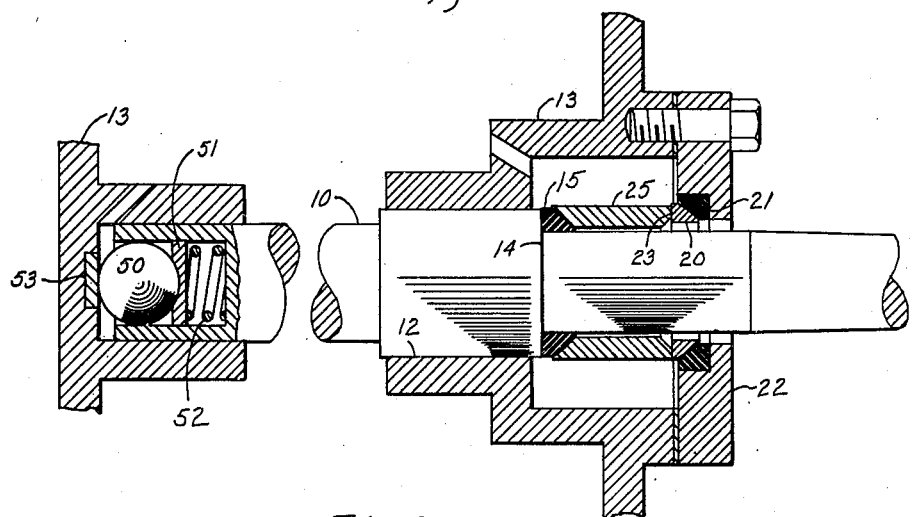
Figure 2 shows another form wherein the flexible member is eliminated by using a tubular member having a sealed face at the outer end and driven at the inner end by an elastic seal between it and the shoulder on the shaft.

In Figure 2, sleeve member 25 forms a driving contact with the elastic member 15 at the inner end and is provided with a seal face at the outer end to make a rotating fluid-tight contact with the member 20 at 23. This type may be used in compressors that are provided with a resilient means at the other end of the shaft such as a hardened ball 50 nested against a slidable member 51 and having a spring 52 tending to force the shaft outwardly. The thrust on the ball 50 is taken by a member 53.

It is obvious that with the use of my design, the creeping or spreading of the elastic material is eliminated. The direct thrust in other types of seals tends to force the elastic material to spread, thereby reducing the contact area. The radial thrust effect that is incorporated in my design creates opposing thrusts that provides fluid-tight joints both horizontally and laterally.

What I claim is:

1. In association with a housing member having a shaft extending therethrough and rotatable with respect thereto, the combination of a sealing organization embodying a sleeve rotatably mounted with and sealed at one end to the shaft, said seal embodying a resilient element encompassing and frictionally secured to the shaft and disposed against a shoulder on the shaft, one end of the sleeve abutting said element, one of the abutting faces being convex and the other concave to receive said convex face, a bearing member against which the other end of the sleeve has a running engagement, a seal for the last said end of the sleeve and embodying a resilient element recessed into a wall of the housing, one of the proximate faces of the last said resilient element and said bearing element being convex and the other being concave and nesting with each other, whereby the sealing organization and the shaft will maintain a free rocking and sealing engagement substantially throughout the entire area of the contacting faces, and resilient means for maintaining the proximate faces of the sealing elements at both ends of the sleeve at all times in contact.

2. In association with a housing member having a shaft extending therethrough and rotatable with respect thereto, the combination of a sealing organization embodying a sleeve rotatably mounted with and sealed at one end to the shaft, said seal embodying a resilient element encompassing and frictionally secured to the shaft and disposed against a shoulder on the shaft, one end of the sleeve abutting said element, one of the abutting faces being convex and the other concave to receive said convex face, a bearing member against which the other end of the sleeve has a running engagement, a seal for the last said end of the sleeve and embodying a resilient element recessed into a wall of the housing, one of the proximate faces of the last said resilient element and said bearing member being convex and the other being concave and nesting with each other, whereby the sealing organization and the shaft may be rocked one with relation to the other, said sleeve embodying a body and end sections, and resilient means disposed intermediate said end sections and operating to maintain them separated and in contact with their cooperating sealing elements.

ARVID E. KARLBERG.